(12) United States Patent
Morales Arriaga

(10) Patent No.: US 10,717,106 B2
(45) Date of Patent: Jul. 21, 2020

(54) ABRASION-MASKING COMPOSITION FOR USE WITH REUSABLE CONTAINERS AND THE METHOD OF USING THE SAME

(71) Applicant: Ecolab USA Inc., St. Paul, MN (US)

(72) Inventor: Fabiola Morales Arriaga, Guadalupe (MX)

(73) Assignee: Ecolab USA Inc., St. Paul, MN (US)

( * ) Notice: Subject to any disclaimer, the term of this patent is extended or adjusted under 35 U.S.C. 154(b) by 21 days.

(21) Appl. No.: 15/374,134

(22) Filed: Dec. 9, 2016

(65) Prior Publication Data

US 2017/0165710 A1 Jun. 15, 2017

Related U.S. Application Data

(60) Provisional application No. 62/265,474, filed on Dec. 10, 2015.

(51) Int. Cl.

| | | |
|---|---|---|
| *B05D 1/30* | (2006.01) | |
| *C03C 17/00* | (2006.01) | |
| *C09D 5/00* | (2006.01) | |
| *B05D 1/02* | (2006.01) | |
| *B05D 1/18* | (2006.01) | |
| *B05D 1/28* | (2006.01) | |
| *B65D 23/08* | (2006.01) | |
| *C03C 17/28* | (2006.01) | |
| *C08J 7/06* | (2006.01) | |

(52) U.S. Cl.
CPC .............. *B05D 1/305* (2013.01); *B05D 1/02* (2013.01); *B05D 1/18* (2013.01); *B05D 1/28* (2013.01); *B65D 23/0821* (2013.01); *C03C 17/005* (2013.01); *C03C 17/28* (2013.01); *C08J 7/065* (2013.01); *C09D 5/00* (2013.01); *C08J 2300/00* (2013.01)

(58) Field of Classification Search
CPC ....... C10M 169/04; C03C 17/28; B05D 1/305
USPC ....................................................... 508/433
See application file for complete search history.

(56) References Cited

U.S. PATENT DOCUMENTS

| | | |
|---|---|---|
| 2,674,619 A | 4/1954 | Lundsted et al. |
| 2,677,700 A | 5/1954 | Jackson et al. |
| 2,903,486 A | 9/1959 | Brown et al. |
| 3,048,548 A | 8/1962 | Martin et al. |
| 3,382,178 A | 5/1968 | Lissant et al. |
| 4,565,647 A | 1/1986 | Llenado |
| 5,454,783 A | 10/1995 | Scholes et al. |
| 6,280,821 B1 | 8/2001 | Kadunce et al. |
| 7,803,280 B2 | 9/2010 | Otsuka et al. |
| 7,998,645 B2 | 8/2011 | Otsuka et al. |
| 9,195,131 B2 | 11/2015 | Orihara et al. |
| 2007/0259140 A1 | 11/2007 | Marlow |
| 2008/0176778 A1* | 7/2008 | Seemeyer .......... C10M 173/025 508/433 |
| 2009/0104387 A1 | 4/2009 | Postupack et al. |
| 2009/0208657 A1 | 8/2009 | Siebenlist et al. |
| 2009/0233192 A1 | 9/2009 | Otsuka et al. |
| 2016/0041462 A1 | 2/2016 | Orihara et al. |

FOREIGN PATENT DOCUMENTS

| | | | |
|---|---|---|---|
| AU | 2003252756 | * 4/2004 | ............. C09K 15/28 |
| AU | 2003252756 A1 | 4/2004 | |
| CN | 102325731 A | 1/2012 | |
| EP | 690032 B1 | 1/1998 | |
| EP | 2098490 A1 | 9/2009 | |
| EP | 2202209 A1 | 6/2010 | |
| EP | 2336093 A1 | 6/2011 | |
| EP | 1794098 B1 | 9/2011 | |
| EP | 2373591 | * 10/2011 | ............. C03C 17/28 |
| EP | 2531458 A1 | 12/2012 | |
| EP | 1753544 B1 | 4/2014 | |
| EP | 1731227 B1 | 7/2014 | |
| EP | 2799405 A1 | 11/2014 | |
| EP | 2373591 B1 | 4/2016 | |
| JP | 11092178 A | 4/1999 | |
| WO | 2000015350 A1 | 3/2000 | |
| WO | 2005049219 A1 | 6/2005 | |
| WO | 2006131318 A1 | 12/2006 | |
| WO | 2007131245 A2 | 11/2007 | |
| WO | 2008134315 A2 | 11/2008 | |
| WO | 2010072784 A1 | 7/2010 | |

OTHER PUBLICATIONS

Derksen et al., "Renewable resources in coatings technology: a review." Progress in Organic Coatings 27 (1996) pp. 45-53.
Arkema Inc., "Returnable Glass Container Coatings." 2009, 11 pages.
International Search Report and Written Opinion for Application No. PCT/US2016/065858 dated Mar. 26, 2017, 9 pages.
Extended European Search Report for Application No. 16873929.0 dated Jun. 14, 2019.
Columbian Office Action for NC2018/0007074, dated Apr. 29, 2020.

* cited by examiner

*Primary Examiner* — Dah-Wei D. Yuan
*Assistant Examiner* — Andrew J Bowman
(74) *Attorney, Agent, or Firm* — Merchant & Gould P.C.

(57) ABSTRACT

A composition for masking scratches on container surfaces is provided including carboxylic acid ester, surfactant, and monounsaturated fatty acid. The composition is suitable for masking scratches on reusable containers such as glass or PET bottles. The composition is suitable for applying to cold wet surfaces where condensation has resulted. A method for making and applying such scratch-masking composition is also provided.

19 Claims, No Drawings

ABRASION-MASKING COMPOSITION FOR USE WITH REUSABLE CONTAINERS AND THE METHOD OF USING THE SAME

CROSS REFERENCE TO RELATED APPLICATIONS

This application is a non-provisional application of U.S. Application No. 62/265,474, filed Dec. 10, 2015, which is incorporated herein by reference in its entirety.

FIELD

The present disclosure provides a composition and a method for masking scratches and abrasions on container surfaces. In particular, the invention provides a composition and method suitable for use on cold and wet containers including glass and PET reusable containers.

BACKGROUND

Containers such as returnable bottles are handled a great number of times during manufacture, inspection, filling, shipping, washing etc. During such handling the bottles come into contact with various mechanical devices such as conveyors, inspection devices, other containers (such as bottles, jars, and the like), and surfaces such as boxes and shelves. This high degree of contact causes damage to the surface by scratching, breakage, cracking, or other defects. Such abrasions are especially visible on dark products like green or brown glass or plastic bottles used in the beverage industry. However, these abrasions are also observed in uncolored bottles.

Every time a container is reused it is exposed to the opportunity to scratch or further scratch the surface. This especially occurs on bottles and scratches or scuff marks generally occur in the shoulder and the bottom area in the form of rings. Such scuffs or abrasions are not only undesirable purely from an aesthetic point of view but they can be undesirable from an economic point of view because they can negatively influence a customer's buying decision. A customer may choose not to purchase a product having a highly scuffed or aesthetically unpleasing container. As such, abrasions can reduce the maximum number of reuse or refillings per container.

The use of scratch or scuff masking agents on glass containers is known. Such masking agents desirably mask scuffs, and exhibit acceptable surface properties and durability. Desirable scuff-masking agents are water-resistant, durable, non-toxic, and removable in alkaline bottle washing operations. Beyond these properties, the scuff-masking agents exhibit good abrasion-masking properties, dry well, are not sticky, remain on the container after washing or alternatively are easily removed during washing, are resistant to moisture, and meet food safety requirements. Coating systems that rely on heat to cure or dry an applied coating are not effective on lines where the glass bottles are cool. Heating may be impossible because raising the temperature of the product to be placed in the container may be detrimental to the organoleptic properties of the product. Even if heating is possible for the product contained in the glass, an additional drying step may be impossible since the coating process usually proceeds automatically. Generally no time exists for extensive drying steps including heat.

Protective coatings are applied to glass containers during manufacture in either a hot end process and/or cold end process. In a cold end process, moisture on the bottles such as from condensation can adversely impact such systems, and with some coatings, long cure times due to moisture (condensation) can adversely impact a coating system. Many existing products show poor or unsatisfactory performance when applied to wet bottles, or on cold bottles which become wet due to condensation. These include, but are not limited to, filling of glass bottles or containers with cold stuffs, typically cold liquids, such as sparkling liquids, e.g. sparkling water, sodas, juice, beer, and the like. This poor performance is attributed to the fact that the condensation water on the outside of the container contributes to further dilution of the masking product resulting in a 'rinsing off' of the applied coating. Such rinsing results in no coating remaining on the container surface.

Some coatings are undesirable due to their hygroscopicity. These coatings become sticky and attract dust which only serves to further deteriorate the appearance of the surface. It is against this background that the present disclosure is made.

Objectives

Some objectives of the invention are to provide a composition to apply on returnable containers in order to facelift or mask the white reflecting bands (scuff bands) that appear at the container contact zones mainly during the filling process and usually after several trips of returnable containers.

Another objective of the invention is to provide a process for applying such composition (a 'masking fluid or liquid') in order to repair the visual appearance of such containers, since the presence of scuff bands degrades the appearance of containers.

A further object of the invention resides in providing an efficient scratch-masking or scuff-masking composition, especially in case of filling conditions in which containers are filled with cold liquids, and water condensation of moisture at the container surface occurs.

Still another objective is to provide a sufficiently stable emulsion for application yet avoid including emulsion breakers. Still another objective of the invention is to provide a composition that has a good resistance to immersion in water and ice water, that is, a composition that is not removed easily if the container on which it is placed is immersed in water.

Yet another object of the present invention is to provide a composition that is not slippery or greasy to the touch. A further object of the composition of the invention is that it is removed easily during bottle washing process with an alkaline wash solution.

A further object of the invention is to provide a composition for masking scratches on container surfaces that is nontoxic and meets the requirements of being generally recognized as safe for use with foods and beverages. Yet another object of the invention is to provide a masking composition and method of application that does not damage labels on the exterior surfaces of the containers.

Another object of the invention is to provide a masking composition compatible with conveyor lubricants. That is, compositions of the invention cannot build up or form residue on the conveyors nor can they influence the lubricants' performance.

An additional object of the invention lies in eliminating paraffinic oils from scuff masking compositions or providing a masking composition substantially free of paraffinic oils.

SUMMARY

A composition for masking scratches on container surfaces is provided. The composition includes a carboxylic acid ester, surfactant, and fatty acid. In an embodiment the surfactant is an ethoxylated alcohol. In another embodiment, the fatty acid is a monounsaturated fatty acid. In a further embodiment, the composition is suitable for masking scratches on container surfaces including but not limited to glass bottles and PET bottles.

The composition for masking scratches on glass or PET surfaces includes from about 50 weight percent to about 99.9 weight percent carboxylic acid ester, from about 0.1 weight percent to about 5 weight percent surfactant, and from about 0.1 weight percent to about 20 weight percent monounsaturated fatty acid. The scratch masking composition may be diluted with from about 5 weight percent to about 95 weight percent water. In an embodiment the scratch-masking composition is an aqueous emulsion.

In an embodiment, the composition for masking scratches on container surfaces such as glass or PET, consists essentially of from about 50 weight percent to about 99.9 weight percent carboxylic acid ester, from about 0.1 weight percent to about 5 weight percent surfactant, and from about 0.1 weight percent to about 20 weight percent monounsaturated fatty acid.

In an embodiment, the composition consists from about 50 weight percent to about 99.9 weight percent carboxylic acid ester, from about 0.1 weight percent to about 5 weight percent surfactant, and from about 0.1 weight percent to about 20 weight percent monounsaturated fatty acid.

In an embodiment, the masking composition is diluted with a diluting liquid such as water. Diluted compositions include from about 4 weight percent to about 90 weight percent carboxylic acid ester, from about 0.1 weight percent to about 2 weight percent surfactant, and from about 0.25 weight percent to about 5 weight percent monounsaturated fatty acid. In another embodiment, diluted masking compositions consist essentially of from about 4 weight percent to about 90 weight percent carboxylic acid ester, from about 0.1 weight percent to about 2.0 weight percent surfactant, and from about 0.1 weight percent to about 5 weight percent monounsaturated fatty acids.

A method of applying a composition to containers for masking scratches is also provided. In an embodiment the method includes applying an undiluted or neat masking composition including carboxylic acid ester, surfactant, and fatty acid to cold glass or PET containers. In an embodiment, the method includes preparing an emulsion of carboxylic acid ester, surfactant, and fatty acid and diluting the emulsion with about 5 wt % to about 95 wt % water before applying the composition to cold glass or PET containers. In some embodiments, the surfactant includes an ethoxylated alcohol and the fatty acids includes monounsaturated fatty acid.

In another embodiment, the method includes applying to containers a composition including from about 50 weight percent to about 99.9 weight percent carboxylic acid ester, from about 0.1 weight percent to about 5 weight percent surfactant, and from about 0.1 weight percent to about 20 weight percent monounsaturated fatty acid.

In an embodiment, the method includes applying to containers a composition consisting essentially of from about 50 weight percent to about 99.9 weight percent carboxylic acid ester, from about 0.1 weight percent to about 5 weight percent surfactant, and from about 0.1 weight percent to about 20 weight percent monounsaturated fatty acid. In yet another embodiment, the method includes applying to containers a composition consisting of from about 50 weight percent to about 99.9 weight percent carboxylic acid ester, from about 0.1 weight percent to about 5 weight percent surfactant, and from about 0.1 weight percent to about 20 weight percent monounsaturated fatty acid.

In an embodiment, the method includes applying to containers a diluted composition consisting essentially of from about 4 weight percent to about 90 weight percent carboxylic acid ester, from about 0.1 weight percent to about 2 weight percent surfactant, and from about 0.25 weight percent to about 5 weight percent monounsaturated fatty acid. In yet another embodiment the method of the invention includes applying a composition consisting of from about 4 weight percent to about 90 weight percent carboxylic acid ester, from about 0.1 weight percent to about 2.0 weight percent surfactant, and from about 0.1 weight percent to about 5 weight percent monounsaturated fatty acid.

The method of applying a scratch-masking composition to a container includes spraying, dipping, flow-coating, brushing, rolling, sponge, nebulization and curtain-coating. In an embodiment the composition is sprayed on the container surfaces through either energized or non-energized nozzles. Energized nozzles refer to nozzles that requires some form of energy, such as high pressure (above and beyond the pressure of the nozzle itself), compressed air, or sonication, to break the composition into fine droplets. Conversely, non-energized nozzles refer to nozzles that are capable of breaking the composition into fine droplets using only the nozzles themselves when operated under the intended operation parameters.

These and other aspects, advantages, and salient features of the present disclosure will become apparent from the following description and claims.

DESCRIPTION

As used herein, the term "cold" refers to temperatures below ambient such as temperatures below about 20° C. A "cold" surface refers to any surface that has a lower temperature than the environment air temperature which would thereby promote the atmospheric moisture to condense on the surface. One skilled in the art will recognize that if the ambient temperature is 23° C., condensation might occur on any surface colder than 23° C. depending upon the relative humidity of the atmosphere. "Cold" for the purposes of this invention refers to the temperature of any surface that is lower than the ambient or environmental temperature thereby potentially promoting condensation to form on the surface. "Cold" may also be defined as a temperature greater than 0 and up to about 5° C., from freezing to about 4.5° C. or from below freezing to about 4.5° C.

As used herein, the term "phosphate-free" refers to a composition, mixture, or ingredient that does not contain a phosphate or phosphate-containing compound or to which a phosphate or phosphate-containing compound has not been added. Should a phosphate or phosphate-containing compound be present through contamination of a phosphate-free composition, mixture, or ingredients, the amount of phosphate is less than about 0.5 wt %, less than about 0.1 wt %, or less than about 0.01 wt %.

As used herein, the term "phosphorous-free" refers to a composition, mixture, or ingredient that does not contain a phosphorous or phosphorous-containing compound or to which a phosphorous or phosphorous-containing compound has not been added. Should a phosphorous or phosphorous-containing compound be present through contamination of a phosphorous-free composition, mixture, or ingredients, the amount of phosphorous is less than about 0.5 wt %, less than about 0.1 wt %, or less than about 0.01 wt %.

As used herein, the term "EDTA-free" refers to a composition, mixture, or ingredient that does not contain EDTA or to which EDTA has not been added. Should EDTA be present through contamination of an EDTA-free composition, mixture, or ingredients, the amount of EDTA is less than about 0.5 wt %, less than about 0.1 wt %, or less than about 0.01 wt %.

As used herein, the term "paraffinic oil-free" refers to a composition, mixture, or ingredient that does not contain a paraffinic oil-containing compound or to which a paraffinic oil has not been added. Should a paraffinic oil be present through contamination of an paraffinic oil-free composition, mixture, or ingredients, the amount of paraffinic oil is less than about 0.5 wt %, less than about 0.1 wt %, or less than about 0.01 wt %.

As used herein, weight percent (wt %), percent by weight, % by weight, and the like are synonyms that refer to the concentration of a substance as the weight of that substance divided by the total weight of the composition and multiplied by 100.

As used herein, the term "about" modifying the quantity of an ingredient in the disclosed compositions or employed in the disclosed methods refers to variation in the numerical quantity that can occur, for example, through typical measuring and liquid handling procedures used for making use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

The term "substantially free" may refer to any component that the disclosed composition lacks or mostly lacks. When referring to "substantially free" it is intended that the component is not intentionally added to the disclosed compositions. Use of the term "substantially free" of a component allows for trace amounts of that component to be included in the disclosed compositions because they are present in another component. However, it is recognized that only trace or de minimus amounts of a component will be allowed when the composition is said to be "substantially free" of that component. Moreover, the term if a composition is said to be "substantially free" of a component, if the component is present in trace or de minimus amounts it is understood that it will not affect the effectiveness of the composition. It is understood that if an ingredient is not expressly included herein or its possible inclusion is not stated herein, the composition may be substantially free of that ingredient. Likewise, the express inclusion of an ingredient allows for its express exclusion thereby allowing a composition to be substantially free of that expressly stated ingredient.

As used herein the term, "consisting essentially of" in reference to a composition refers to the listed ingredients and does not include additional ingredients that, if present, would affect the scuff masking ability of the composition. The term "consisting essentially of" may also refer to a component of the composition. For instance, a surfactant package may consist essentially of two or more surfactants and such surfactant package would not include any other ingredients that would affect the effectiveness of that surfactant package—either positively or negatively. As used herein the term "consisting essentially of" in reference to a method of applying refers to the listed steps and does not include additional steps (or ingredients if a composition is included in the method) that, if present, would affect the ability of the composition to mask scratches on a surface.

The term "surfactant" or "surface active agent" refers to a chemical or additive that when added to a liquid changes the properties of that liquid at a surface.

Carboxylic Acid Ester

It has surprisingly been found that in applying the combination of a surfactant, preferably a nonionic surfactant, a carboxylic acid ester and a monounsaturated fatty acid to the surface of reusable containers that the appearance of scratches and scuff marks are diminished. The carboxylic acid esters included in the disclosed compositions may include a plurality of carboxylic acid esters, such as a mixture of esters, derivatives, or mixtures of monocarboxylic, dicarboxylic or tricarboxylic acid which may be derived from the same or a plurality of different alcohols and carboxylic acids. Mixtures of monoaliphatic esters of carboxylic acid, mixtures of dialiphatic esters of carboxylic acid, mixtures of trialiphatic esters of carboxylic acid, or mixtures of mono, di and trialiphatic esters of carboxylic acid may be employed in the disclosed compositions. Examples of esters include the mono-, di- or triesters of carboxylic acid derived from the following alcohols: n-propyl, isopropyl, n-butyl, crotyl, isobutyl, isoamyl, and 2-ethylhexyl.

Esters are derived from a reaction of an alcohol with a carboxylic acid, wherein the latter may be organic or inorganic. Examples of esters useful in preparing carboxylic acid esters useful in the composition of the invention include acetate, propionate, and butyrate, also referred to as methanoate, ethanoate, propanoate and butanoate using IUPAC nomenclature.

An example of a useful carboxylic acid ester is ethyl acetate derived from an alcohol (left) and an acyl group (right) derived from a carboxylic acid:

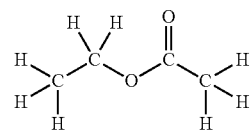

The chemical formulas of organic esters usually take the form $RCO_2R'$, where R and R' are the hydrocarbon parts of the carboxylic acid and the alcohol, respectively.

In an embodiment, the carboxylic acid ester is water insoluble. Examples of a water-insoluble carboxylic acid esters suitable for use in compositions of the invention include is not limited to butyl acetate, acetyltributyl citrate, isoamyl acetate, acetyl-tri-n-butyl citrate, N-propyl acetate, acetyltryethyl citrate, tri-n-butyl citrate, heptyl caprylate, acetyltri-n-butyl citrate, octyl caprylate, pentyl valerate, 3-carboxy-3-hydroxypentane-1,5-dioic acid, acetyltri-n-hexyl citrate, isoamyl caprylate, pentyl butyrate, n-butyryl-tri-n-hexyl citrate, and combinations thereof.

In an embodiment, the carboxylic acid ester is present in an amount from about 50 wt % to about 99.9 wt %, from about 60 wt % to about 99 wt %, from about 65 wt % to about 98 wt %, from about 70 wt % to about 97 wt %, from about 75 wt % to about 96 wt %, from about 80 wt % to about 95 wt %, from about 85 wt % to about 94 wt %, or from about 91.5 wt % to about 94.5 wt % based on the total weight of the neat masking composition.

When used, the masking composition may be diluted with water. In some embodiments the carboxylic acid ester be may present from about 2 wt % to about 94.9 wt %, from about 3 wt % to about 90.2 wt %, from about 3.25 wt % to about 85.5 wt %, from about 3.5 wt % to about 80.7 wt %, from about 3.75 wt % to about 76 wt %, from about 4 wt % to about 71.2 wt %, from about 4.2 wt % to about 66.5 wt %, from about 4.5 wt % to about 61.7 wt %, from about 4.7 wt % to about 57 wt %, or from about 4.99 wt % to about 47.5 wt % based on the total weight of the diluted masking composition.

Surfactants

The composition includes one or more surfactants. Suitable surfactants include nonionic, cationic, anionic, amphoteric, and zwitterionic surfactants and their combinations. In some embodiments, the surfactant is preferably a nonionic surfactant.

Nonionic Surfactants.

Exemplary nonionic surfactants include, without limitation, alcohol ethoxylates. Alcohol ethoxylates useful in compositions of the invention may be derived from either synthetic or natural fatty alcohols. Examples of synthetic alcohols used for ethoxylation are available from hydroformylation leading to oxoalcohols or from the oligomerization of ethylene with Ziegler catalysts. Natural fatty alcohols are produced by reduction of fatty acids. Oxoalcohol ethoxylates having a linear or branched carbon chain with a narrow to broad carbon chain length distribution may be used in the present invention. Examples of suitable alcohol ethoxylates include, without limitation, SURFONIC® L12-6 commercially available from Huntsman, Emulsogen LA 3065, Arkopal® N series, commercially available from Clariant, Croda's group of ethoxylated fatty alcohols are sold under the Brij™ or Synperonic™ tradenames. Further examples of nonionic surfactants useful in compositions of the invention include but are not limited to alcohol ethoxylate propoxylates, alcohol propoxylates, alcohol propoxylate ethoxylate propoxylates, alcohol ethoxylate butoxylates, 1 Dehydol® range available from BASF, and the like, or combinations thereof. Alcohol ethoxylates may either be linear or branched chain ethoxylates. In an embodiment a laureth alcohol ethoxylate is included in the composition such as Laureth-3, Laureth-4, Laureth-9, Oleth-2, Oleth-5, Trideceth-3, or Trideceth-5.

Other exemplary nonionic surfactants are listed below.

Block polyoxypropylene-polyoxyethylene polymeric compounds based upon propylene glycol, ethylene glycol, glycerol, trimethylolpropane, and ethylenediamine as the initiator reactive hydrogen compound, such as: difunctional block copolymers (PLURONIC® products available from BASF Corp.); and tetra-functional block copolymers (TETRONIC® products available from BASF Corp.)

Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Commercially available examples include IGEPAL® available from Solvay S. A., and TRITON® available from the DOW Chemical Company.

Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Commercially available examples include NEODOL® available from Shell Chemical Co. and ALFONIC available from Sasol North America, Inc.

Condensation products of one mole of saturated or unsaturated, straight or branched chain carboxylic acid having from about 8 to about 18 carbon atoms with from about 6 to about 50 moles of ethylene oxide. The acid can be a mixture of acids in the above-defined carbon atoms range or it can be an acid having a specific number of carbon atoms within the range. Commercially available examples include LIPOPEG® available from Lipo Chemicals, Inc.

Alkanoic acid esters formed by reaction with glycerides, glycerin, and polyhydric (saccharide or sorbitan/sorbitol) alcohols. All of these ester moieties have one or more reactive hydrogen sites on their molecule which can undergo further acylation or ethylene oxide (alkoxide) addition to control the hydrophilicity of these substances.

In some embodiments the composition comprises low-foaming nonionic surfactants. Exemplary low-foaming nonionic surfactants include:

Reverse block copolymers which are block copolymers, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. Also included are di-functional reverse block copolymers (commercially available as PLURONIC® R from BASF Corp.) and tetra-functional reverse block copolymers (commercially available as TETRONIC® R from BASF Corp.)

Capped nonionic surfactants which are modified by "capping" or "end blocking" the terminal hydroxy group or groups (of multifunctional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

The alkylphenoxypolyethoxyalkanols of U.S. Pat. No. 2,903,486 issued Sep. 8, 1959 to Brown et al. and represented by the formula:

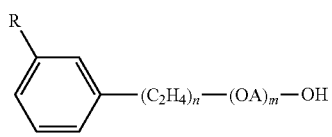

where R is an alkyl group of 8 to 9 carbon atoms; A is an alkylene chain of 3 to 4 carbon atoms;

n is an integer of 7 to 16; and m is an integer of 1 to 10. Polyalkylene glycol condensates described in U.S. Pat. No. 3,048,548 issued Aug. 7, 1962 to Martin et al., having alternating hydrophilic oxyethylene chains and hydrophobic oxypropylene chains where the weight of the terminal hydrophobic chains, the weight of the middle hydrophobic unit and the weight of the linking hydrophilic units each representing about one-third of the condensate.

Defoaming nonionic surfactants disclosed in U.S. Pat. No. 3,382,178 issued May 7, 1968 to Lissant et al. having the general formula $Z[(OR)_nOH]_z$, where Z is an alkoxylatable material; R is a radical derived from an alkaline oxide which can be ethylene and propylene; n is an integer from 10 to 2,000 or more; and z is an integer determined by the number of reactive oxyalkylatable groups. Examples of commercially available defoaming or low foaming nonionic surfactants include LUTENSOL® and PLURAFAC®, both available from BASF Corp. Conjugated polyoxyalkylene compounds described in U.S. Pat. No. 2,677,700, issued May 4, 1954 to Jackson et al. corresponding to the formula $Y(C_3H_6O)_n(C_2H_4O)_mH$ where Y is the residue of organic compound having from about 1 to 6 carbon atoms and one reactive hydrogen atom; n is an average value of at least about 6.4, as determined by hydroxyl number; and m is a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O)_n(C_2H_4O)_mH]_x$ where Y is the residue of an organic compound having from about 2 to 6 carbon atoms and containing x reactive hydrogen atoms where x has a value of at least about 2; n is a value such that the molecular weight of the polyoxypropylene hydrophobic base is at least about 900; and m is a value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents correspond to the formula: $P[(C_3H_6O)_n(C_2H_4O)_mH]_x$ where P is the residue of an organic compound having from about 8 to 18 carbon atoms and containing x reactive hydrogen atoms where x has a value of 1 or 2; n is a value such that the molecular weight of the polyoxyethylene portion is at least about 44; and m is a value such that the oxypropylene content of the molecule is from about 10% to about 90% by weight. In either case the oxypropylene chains may optionally contain small amounts of ethylene oxide and the oxyethylene chains may also optionally contain small amounts of propylene oxide. Other conjugated polyoxyalkylene surface-active agents sometimes described as extended surfactants correspond to the formula: $P(C_3H_6O)_n(C_2H_4O)_mH$ where P is the residue of an organic compound having from about 8 to 18 carbon atoms and containing x reactive hydrogen atoms where x has a value of 1 or 2; n has a value of 1-20; and m has a value of 1-20. An example is the LUTENSOL XL series from BASF.

Polyhydroxy fatty acid amide surfactants include those having the structural formula $R^2CONR^1Z$ where $R^1$ is H, $C_1$-$C_4$ hydrocarbyl, 2-hydroxy ethyl, 2-hydroxy propyl, ethoxy, propoxy group, or a mixture thereof; $R^2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

Alkyl ethoxylate condensation products of aliphatic alcohols with from about 0 to about 25 moles of ethylene oxide. The alkyl chain of the aliphatic alcohol can either be straight or branched, primary or secondary, and generally contains from 6 to 22 carbon atoms. Ethoxylated $C_6$-$C_{18}$ fatty alcohols and $C_6$-$C_{18}$ mixed ethoxylated and propoxylated fatty alcohols. Suitable ethoxylated fatty alcohols include the $C_{10}$-$C_{18}$ ethoxylated fatty alcohols with a degree of ethoxylation of from 3 to 50.

Nonionic alkylpolysaccharide surfactants include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units. Similar functionality can be achieved by glucamide surfactants, such as GLUCOPURE products available from Clariant.

Fatty acid amide surfactants include those having the formula $R^6CON(R^7)_2$ where $R^6$ is an alkyl group containing from 7 to 21 carbon atoms; and each $R^7$ is independently hydrogen, $C_1$-$C_4$ alkyl, $C_1$-$C_4$ hydroxyalkyl, or —$(C_2H_4O)_xH$, where x is from 1 to 3.

Another class of nonionic surfactants include the class defined as alkoxylated amines or, most particularly, alcohol alkoxylated/aminated/alkoxylated surfactants. These nonionic surfactants may be at least in part represented by the general formulae: $R^{20}$—$(PO)_sN$-$(EO)_tH$, $R^{20}$—$(PO)_sN$-$(EO)_tH(EO)_tH$, and $R^{20}$—$N(EO)_tH$; where $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1-20, preferably 2-5, t is 1-10, preferably 2-5, and u is 1-10, preferably 2-5.

Other variations on the scope of these compounds may be represented by the alternative formula $R^{20}$—$(PO)_v$—$N[(EO)_wH][(EO)_zH]$, where $R^{20}$ is an alkyl, alkenyl or other aliphatic group, or an alkyl-aryl group of from 8 to 20, preferably 12 to 14 carbon atoms, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. One exemplary chemical of this class includes SURFONIC™ PEA 25 Amine Alkoxylate.

The composition may further comprise semi-polar nonionic surfactants. Examples of semi-polar nonionic surfactants include:

Amine oxides are tertiary amine oxides corresponding to the general formula:

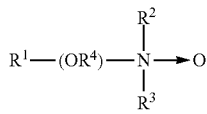

where the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Useful water soluble amine oxide surfactants can be selected from coconut or tallow alkyl di-(lower alkyl) amine oxides, specific examples of which are dodecyldimethylamine oxide, tridecyldimethylamine oxide, tetradecyldimethylamine oxide, pentadecyldimethylamine oxide, hexadecyldimethylamine oxide, heptadecyldimethylamine oxide, octadecyldimethylamine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl) dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Semi-polar nonionic surfactants also include the water soluble phosphine oxides having the following structure:

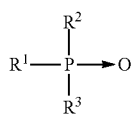

where the arrow is a conventional representation of a semi-polar bond; $R^1$ is an alkyl, alkenyl or hydroxyalkyl moiety ranging from 10 to about 24 carbon atoms in chain length; and $R^2$ and $R^3$ are each alkyl moieties separately selected from alkyl or hydroxyalkyl groups containing 1 to 3 carbon atoms. Examples of useful phosphine oxides include dimethyldecylphosphine oxide, dimethyltetradecylphosphine oxide, methylethyltetradecyl-phosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide.

Semi-polar nonionic surfactants also include the water soluble sulfoxide compounds which have the structure:

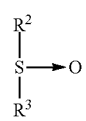

where the arrow is a conventional representation of a semi-polar bond; $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms. Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

In some embodiments, one or more nonionic surfactant may be included in the scratch masking composition. A nonionic surfactant package may be used to prepare the disclosed compositions.

Anionic Surfactants.

Exemplary anionic surfactants include: carboxylic acids and their salts, such as alkanoic acids and alkanoates, ester carboxylic acids (e.g. alkyl succinates), ether carboxylic acids, and the like; phosphoric acid esters and their salts; sulfonic acids and their salts, such as isethionates, alkylaryl sulfonates, alkyl sulfonates, ester sulfonates, sulfosuccinates; and sulfuric acid esters and their salts, such as alkyl ether sulfates, alkyl sulfates, and the like.

Anionic surfactants includes those with a negative charge on the hydrophilic group or surfactants in which the molecule carries no charge unless pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. The particular salts will be suitably selected depending upon the needs of the particular formulation.

The majority of large volume commercial anionic surfactants can be subdivided into five major chemical classes and additional sub-groups known to those of skill in the art and described in "Surfactant Encyclopedia," *Cosmetics & Toiletries*, Vol. 104 (2) 71-86 (1989). The first class includes acylamino acids (and salts), such as acylgluamates, acyl peptides, sarcosinates (e.g. N-acyl sarcosinates), taurates (e.g. N-acyl taurates and fatty acid amides of methyl tauride), and the like. The second class includes carboxylic acids (and salts), such as alkanoic acids (and alkanoates), ester carboxylic acids (e.g. alkyl succinates), ether carboxylic acids, and the like. The third class includes phosphoric acid esters and their salts. The fourth class includes sulfonic acids (and salts), such as isethionates (e.g. acyl isethionates), alkylaryl sulfonates, alkyl sulfonates, sulfosuccinates (e.g. monoesters and diesters of sulfosuccinate), and the like. The fifth class includes sulfuric acid esters (and salts), such as alkyl ether sulfates, alkyl sulfates, and the like.

Exemplary anionic surfactants include the following:

Linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside (the nonionic nonsulfated compounds being described herein).

Ammonium and substituted ammonium (such as mono-, di- and triethanolamine) and alkali metal (such as sodium, lithium and potassium) salts of the alkyl mononuclear aromatic sulfonates such as the alkyl benzene sulfonates containing from 5 to 18 carbon atoms in the alkyl group in a straight or branched chain, e.g., the salts of alkyl benzene sulfonates or of alkyl toluene, xylene, cumene and phenol sulfonates; alkyl naphthalene sulfonate, diamyl naphthalene sulfonate, and dinonyl naphthalene sulfonate and alkoxylated derivatives.

Anionic carboxylate surfactants such as alkyl ethoxy carboxylates, the alkyl polyethoxy polycarboxylate surfactants and the soaps (e.g. alkyl carboxylates). Secondary soap surfactants (e.g. alkyl carboxyl surfactants) include those which contain a carboxyl unit connected to a secondary carbon. The secondary carbon can be in a ring structure, e.g. as in p-octyl benzoic acid, or as in alkyl-substituted cyclohexyl carboxylates. The secondary soap surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present.

Other anionic surfactants include olefin sulfonates, such as long chain alkene sulfonates, long chain hydroxyalkane sulfonates or mixtures of alkenesulfonates and hydroxyalkane-sulfonates. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule). Resin acids and hydrogenated resin acids are also suitable, such as rosin, hydrogenated rosin, and resin acids and hydrogenated resin acids present in or derived from tallow oil.

Cationic Surfactants.

Exemplary cationic surfactants include amines, such as alkylamines and amido amines. The composition may comprise cationic surfactants, selected either from the amino group, or from other cationic surfactants. The amine group includes, for example, alkylamines and their salts, alkyl imidazolines, ethoxylated amines, and quaternary ammonium compounds and their salts. Other cationic surfactants include sulfur (sulfonium) and phosphorus (phosphonium) based compounds that are analogous to the amine compounds.

Cationic surfactants generally refer to compounds containing at least one long carbon chain hydrophobic group and at least one positively charged nitrogen. The long carbon chain group may be attached directly to the nitrogen atom by simple substitution; or indirectly by a bridging functional group or groups in so-called interrupted alkylamines and amido amines. Such functional groups can make the molecule more hydrophilic or more water dispersible, more easily water solubilized by co-surfactant mixtures, or water soluble. For increased water solubility, additional primary, secondary or tertiary amino groups can be introduced or the amino nitrogen can be quarternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn as:

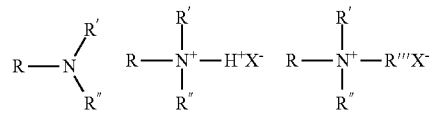

in which, R represents a long alkyl chain, R', R", and R'" may be either long alkyl chains or smaller alkyl or aryl groups or hydrogen and X represents an anion.

The majority of large volume commercial cationic surfactants can be subdivided into four major classes and additional sub-groups known to those of skill in the art and described in "Surfactant Encyclopedia," Cosmetics & Toiletries, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties including detergency in compositions of or below neutral pH, antimicrobial efficacy, thickening or gelling in cooperation with other agents, and the like.

Exemplary cationic surfactants include those having the formula $R^1_m R^2_x Y_L Z$ wherein each $R^1$ is an organic group containing a straight or branched alkyl or alkenyl group optionally substituted with up to three phenyl or hydroxy groups and optionally interrupted by up to four of the following structures:

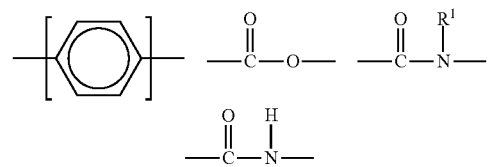

or an isomer or mixture of these structures, and which contains from 8 to 22 carbon atoms. The $R^1$ groups can additionally contain up to 12 ethoxy groups; m is a number from 1 to 3. Preferably, no more than one $R^1$ group in a molecule has 16 or more carbon atoms when m is 2, or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens.

Y can be a group, such as one of the following:

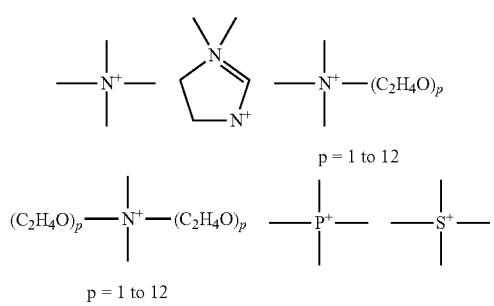

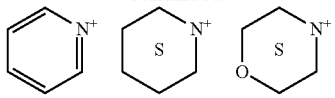

or a mixture thereof. Preferably, L is 1 or 2, with the Y groups being separated by a moiety selected from $R^1$ and $R^2$ analogs (preferably alkylene or alkenylene) having from 1 to 22 carbon atoms and two free carbon single bonds when L is 2. Z is a water soluble anion, such as sulfate, methylsulfate, hydroxide, or nitrate anion, particularly preferred being sulfate or methyl sulfate anions, in a number to give electrical neutrality of the cationic component.

Amphoteric and Zwitterionic Surfactants.

Amphoteric and zwitterionic surfactants include derivatives of secondary and tertiary amines, derivatives of heterocyclic secondary and tertiary amines, or derivatives of quaternary ammonium, quaternary phosphonium or tertiary sulfonium compounds. The ammonium, phosphonium, or sulfonium compounds can be substituted with aliphatic substituents, e.g., alkyl, alkenyl, or hydroxyalkyl; alkylene or hydroxy alkylene; or carboxylate, sulfonate, sulfate, phosphonate, or phosphate groups. Betaine and sultaine surfactants are exemplary zwitterionic surfactants for use in the present composition. Zwitterionic surfactants can be thought of as a subset of amphoteric surfactants. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion, a negative charged carboxyl group, and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate. Betaine and sultaine surfactants are exemplary zwitterionic surfactants.

A general formula for these compounds is:

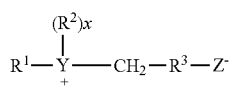

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups can be straight or branched and saturated or unsaturated.

Zwitterionic surfactants include betaines and sultaines of the general structure:

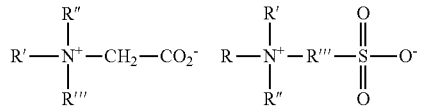

For example, cocamidopropyl betaine has the following structure:

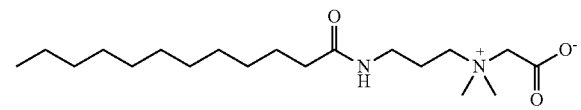

And cocamidopropyl sultaine has the following structure:

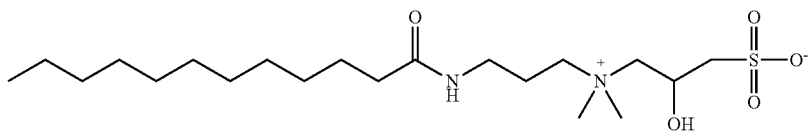

These surfactant betaines typically do not exhibit strong cationic or anionic characters at pH extremes, nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentane-diethylbetaine; and $C_{12-16}$ acylmethylamidodimethylbetaine.

Sultaines include those compounds having the formula $(R(R^1)_2N^+R^2SO_3^-)$, in which R is a $C_6-C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

Amphoteric Surfactants.

Amphoteric or ampholytic surfactants contain both a basic and an acidic hydrophilic group and an organic hydrophobic group. These ionic entities may be any of the anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia," Cosmetics & Toiletries, Vol. 104 (2) 69-71 (1989). The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation, for example with ethyl acetate. During alkylation, one or two carboxy-alkyl groups react to form a tertiary amine and an ether linkage with differing alkylating agents yielding different tertiary amines.

Exemplary commercially available imidazoline-derived amphoterics include: cocoamphopropionate, cocoamphocarboxy-propionate, cocoamphoglycinate, cocoamphocarboxy-glycinate, cocoamphopropyl-sulfonate, and cocoamphocarboxy-propionic acid. Preferred amphocarboxylic acids are produced from fatty imidazolines in which the dicarboxylic acid functionality of the amphodicarboxylic acid is diacetic acid and/or dipropionic acid. The carboxymethylated compounds (glycinates) described here are frequently called betaines.

Long chain N-alkylamino acids are readily prepared by reacting $RNH_2$, in which R is $C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes include alkyl beta-amino dipropionates, $RN(C_2H_4COOM)_2$ and $RNHC_2H_4COOM$. In these, R is preferably an acyclic hydrophobic group containing from 8 to 18 carbon atoms, and M is a cation to neutralize the charge of the anion.

Preferred amphoteric surfactants include those derived from coconut products such as coconut oil or coconut fatty acid. The more preferred of these coconut derived surfactants include as part of their structure an ethylenediamine moiety, an alkanolamide moiety, an amino acid moiety, preferably glycine, or a combination thereof; and an aliphatic substituent of from 8 to 18 (preferably 12) carbon atoms. Such a surfactant can also be considered an alkyl amphodicarboxylic acid. Disodium cocoampho dipropionate is one most preferred amphoteric surfactant and is commercially available under the tradename MIRANOL™ FBS from Solvay S. A. Another most preferred coconut derived amphoteric surfactant with the chemical name disodium cocoampho diacetate is sold under the tradename MIRANOL™ C2M-SF Conc., also from Solvay S. A.

Surfactant Concentration.

The amount of surfactant may be from about 0.01 wt % to about 7.0 wt %, from about 0.05 wt % to about 5 wt %, from about 0.1 wt % to about 4.0 wt %, from about 0.5 wt % to about 3.5 wt %, from about 1 wt % to about 3 wt %, or from about 1.5 wt % to about 2.5 wt % based on the total weight of the neat masking composition.

When used, in one embodiment the masking composition is diluted with water. In some embodiments the surfactant be may be present from about 0.0005 wt % to about 6.65 wt %, from about 0.0025 wt % to about 4.75 wt %, from about 0.075 wt % to about 3.5 wt %, from about 0.15 wt % to about 2.85 wt %, from about 0.25 wt % to about 2.25 wt %, or from about 0.35 wt % to about 1.42 wt % based on the total weight of the diluted masking composition.

Monounsaturated Fatty Acid

The compositions include at least one monounsaturated fatty acid distinguishable from the surfactant. Examples of suitable monounsaturated fatty acids include but are not limited to monounsaturated fatty acids such as myristoleic acid, palimitoleic acid, sapienic acid, oleic acid, elaidic acid, vaccenic acid, linoleic acid, linolaidic acid, alpha-linolenic acid, arachidonic acid, eicosapentaenoic acid, eurcic acid, and docosahexaenoic acid, and combinations thereof. Examples of suitable saturated fatty acids include butyric acid, capric acid, caproic acid, caprilic acid, capric acid, lauric acid, myristic acid, palmitic acid, and stearic acid, and combinations thereof. In an embodiment, the fatty acid is selected so as not to impart an unpleasant odor to the composition.

As to an amount of fatty acid, in some aspects it may be may be from about 0.5 wt % to about 35.0 wt %, from about 1 wt % to about 30 wt %, from about 1.5 wt % to about 25 wt %, from about 2 wt % to about 20 wt %, from about 2.5 wt % to about 15 wt %, or from about 3 wt % to about 10 wt % based on the total weight of the neat masking composition.

When used, in one embodiment the masking composition is diluted with water. In some embodiments the fatty acid be may present from about 0.005 wt % to about 33.25 wt %, from about 0.075 wt % to about 19 wt %, from about 0.125 wt % to about 12 wt %, from about 0.5 wt % to about 9.5 wt %, from about 1 wt % to about 8 wt %, or from about 1.75 wt % to about 5 wt % based on the total weight of the diluted masking composition.

The table below includes exemplary ranges for each ingredient in the neat compositions.

| Ingredient | Percent by Weight | | |
|---|---|---|---|
| Carboxylic Acid Ester | 50-99 | 70-97 | 85-94 |
| Nonionic Surfactant | 0.01-7 | 0.1-4 | 1-3 |
| Monounsaturated Fatty Acid | 0.5-35 | 2-20 | 3-10 |

The table below includes exemplary ranges for each ingredient in the diluted compositions.

| Ingredient | Percent by Weight | | |
|---|---|---|---|
| Carboxylic Acid Ester | 2.0-94.9 | 4.5-57 | 4.9-47.5 |
| Nonionic Surfactant | 0.0005-6.65 | 0.075-3.5 | 0.25-2.25 |
| Monounsaturated Fatty Acid | 0.005-33.25 | 0.5-9.5 | 1-8 |
| Diluting Liquid | 5-98 | 40-93 | 60-88 |

Optional Materials

In addition to the carboxylic acid ester, the surfactant and the monounsaturated fatty acid, the disclosed compositions can include other optional materials. Exemplary materials include but are not limited to rheology modifiers, lubricants, antimicrobial agents, fluorescent tracers and combinations thereof.

Rheological Modifiers.

The composition may include an optional rheological modifier. The rheological modifier may increase the viscosity of the composition, increase the particle size of the composition when it is sprayed on the containers, help improve the stability of the emulsion, and provide vertical cling of the composition on the surface of the container. When used in a masking composition, the rheological modifier can also help form a film on the container and improve the water-repelling properties of the composition. The rheological modifier may provide a use composition that is pseudo-plastic, meaning that when left undisturbed, it retains a high viscosity, when sheared the viscosity is substantially but reversibly reduced, and after shear the high viscosity returns. In the disclosed application, the viscosity of the composition may be high when it is a concentrate or diluted with water, the viscosity may go down when the composition is sprayed through a spray nozzle or other dispensing device, and the viscosity may go back up when the composition is resting on the container surface. While resting on the container surface, the rheological modifiers can prevent the composition from dripping, running, sagging, or moving down the container as a result of gravity. Exemplary rheological modifiers include natural or synthetic polymers, gums or clays. Specific examples include carboxylated vinyl polymers such as polyacrylic acids and their sodium salts, polyacrylamide thickeners, cross-linked polyacrylate, xanthan compositions, sodium alginate and algin products, hydroxymethyl cellulose, hydroxyethyl cellulose, hydroxypropyl cellulose, natural resins such as Colofonia resin, pine resin and copal resin, shellac, oils derived from oil seeds, plants and animals, and derivatives and combinations thereof. Commercially available cellulose products include those sold under the names METHOCEL and ETHOCEL (e.g., Methocel MX, Methocel E19, ETH STD 45, Ethocel STD 100) from Dow Chemical Company or the name KLUCEL from Ashland, The rheological modifier may be present from about 0.2 to about 15 wt. %, from about 0.3 to about 10 wt. %, or from about 0.5 to about 5 wt. %.

Lubricants.

The composition may optionally include a lubricant to improve the movement of the container during processing (including bottling and packaging stages), reduce the friction of the bottle with any surfaces that it encounters during processing, and reduce additional scratches and scuff marks. Exemplary lubricants include but are not limited to: synthetic waxes such as Cerasperse 174, Cerasperse 321 BGW, and Cerasperse 174; polytetrafluoroethylene (PTFE); PTFE compounded in refined linseed oil; componds of PTFE and waxes such as Cerasperse 321BG; polysiloxanes such as SILIKOFTAL NON-STICK 60; polysiloxane polymers, copolymers, and derivatives such as TEGO Glide 432 and TEGO Glide A 115; and derivatives and combinations thereof. The lubricant may be present in the composition from about 0.5 to about 25 wt. %, from about 1 to about 20 wt. %, from about 2 to about 15 wt. %, or from about 3 to about 10 wt. %.

Antimicrobials.

The composition may optionally include an antimicrobial agent to slow or reduce biological growth in the composition. Exemplary antimicrobial agents include phenols including halo- and nitrophenols and substituted bisphenols such as 4-hexylresorcinol, 2-benzyl-4-chlorophenol and 2,4,4'-trichloro-2'-hydroxybiphenyl ether, organic and inorganic acids such as citric acid and ascorbic acid and their esters and salts such as dehydroacetic acid, peroxycarboxylic acids, peroxyacetic acid, methyl p-hydroxy benzoic acid, cationic agents such as aromatic or linear quaternary ammonium compounds, aldehydes such as glutaraldehyde, isothiazolinone compounds such as 5-chloro-2-methyl-4-isothiazolin-3-one and 2-methyl-4-isothiazolin-3-one, fatty amine compounds such as oleyl diaminopropane, cocoalkyl diaminopropane, and lauryl dimethylamine, and halogens including iodine and chlorine compounds. The antimicrobial may be present in the composition in an amount sufficient to provide desired antimicrobial properties or from 0 to about 20 wt. %, or from about 0.5 to about 10 wt. %.

Tracers.

The composition may optionally include a fluorescent dye to trace and quantify the composition. Exemplary tracers include those sold by the Nalco Company under the name TRASAR® or 3D TRASAR®.

Method of Making Masking Composition

The masking composition is prepared by combining the carboxylic acid ester and the fatty acid. The surfactant is then added to the carboxylic acid ester and fatty acid combination and the resulting combination is stirred until complete homogenization. In another embodiment the reverse method is used to prepare the combination. That is, the surfactant and carboxylic acid ester are first combined and the fatty acid is then added to the surfactant and carboxylic acid ester combination. The resulting composition is stirred until complete homogenization results.

Dilution

The composition is provided neat or as a concentrate that may be diluted with diluting liquid to a use solution. Such diluting liquid may be water, alcohol, such as isopropyl alcohol or ethanol, glycerin, monoethyleneglycol, and monopropylenglycol or a combination thereof. In some embodiments, paraffinic oils such as mineral oil are not used as dilution liquids. Likewise, in certain embodiments, the compositions are substantially free or free of mineral oils.

In an embodiment, the composition is applied to the container surface undiluted or neat. In other embodiments, the composition is diluted with water before it is applied to a container surface. Such dilution may occur at a food plant before application to the containers. In an embodiment, the neat masking composition is diluted with water. Such water may be tap or deionized or distilled water. Since tap water is cheapest and most widely available, the composition may be diluted with tap water. The dilution water may have between about 0 and about 350 ppm CaCO3. If the hardness of the dilution water is high, above about 350 ppm CaCO3, it may be convenient to use water softening equipment.

The dilution of the neat masking composition with the diluting liquid such as water is between about 5 wt % to about 98 wt % water, between about 20 wt % to about 95 wt % water, between about 40 wt % and about 93 wt % water, between about 50 wt % and about 90 wt % water, and between about 60 wt % and about 88 wt % water. The dilution rate is between about 1:2 to about 1:90 masking composition to water.

Method of Using Masking Composition

No specific equipment is required for applying the composition to container surfaces; meaning that any and all known equipment in the art is convenient for the preparation, use and method of the invention. The compositions may be applied either before or after filling the containers. The containers are filled and capped according to known methods. In an embodiment, the containers are glass or PET and they are filled with cold liquids. Filling containers with cold liquids causes the temperature of the container to fall thereby allowing for the potential for humidity in the air to condense on the surface of the container. In an embodiment the scratch-masking composition is applied after the container is filled and closed. In another embodiment the scratch-masking composition is applied before the container is filled.

As evidenced by the examples, the efficiency of the scratch-masking composition is not adversely affected by the condensation that may appear on the outer surface of the glass container, because of differences of temperatures between the container, the filled liquid, and/or the outer temperature and relative humidity of the environment.

Labelling may occur before or after applying the scratch-masking composition. The step of applying the scratch-masking composition may be the last step before the newly washed, refilled and labelled glass containers are once again put on the market, and sold to the customers.

The application equipment may typically include mixing and storage vessels, pumps, transfer and feed lines, spray apparatus and control and monitoring equipment. In an embodiment the equipment includes one or more mixing vessel(s); dosing and circulating pump(s); mixing unit (can be the pump itself); circulation pipe(s); applying means, such as, sponge, brushes, nebulization, spray nozzles; and the like. If applied via spraying, the composition may be applied through either energized or non-energized nozzles. Other methods or means of applying the masking composition to the containers are envisioned including via dipping, immersion, brush, roller, flow-coating, and curtain-coating.

In an embodiment, the composition is stored in a container that is connected to a valve via a plastic tube. A separate water line is also connected to the valve. The water and the composition combine at the valve and flow into a stainless steel pipe (e.g., static mixer) where they are mixed as a result of the fluid flow through the pipe. After mixing with water in the pipe, the composition is sprayed onto the bottle via nozzles.

In an embodiment, the container is moved relative to the applying means while the coating liquid is applied to the outside of the container. In one embodiment, the spray means is operated continuously. This means that the glass containers are continuously transported by means of a conveyor line through the coating station where the spray means is operated continuously to shower the outside of the glass containers with the coating liquid. However, there is an alternative approach where the applying means is operated discontinuously and applies coating liquid only stepwise or upon recognition that a glass container is present in the coating station. This alternative method saves a substantial amount of coating liquid, because the coating liquid is applied only to a glass container that is indeed present in the coating station.

In an embodiment, the composition is an emulsion, in particular an oil in water emulsion. However, a balanced solution of liquids, preferably, a water-based solution of liquids may be used as well. An emulsion, in particular an oil in water emulsion, is balanced to remain sufficiently stable for application. As discussed, water is a diluting liquid. In an embodiment the coating liquid is fed to the applying means via at least one feed line. The common feed line for the coating liquid is additionally helpful to allow for an even distribution of the coating liquid onto the outside of the glass container. The coating composition may be diluted on site or at a separate location.

The equipment may also comprise a controller for monitoring the application of the scratch-masking composition. The controller may be, for example, an optical sensor for detecting the presence or the absence of a container in front of the applying means, and/or detecting the presence and the quantity of scuff bands or scratches, so that the minimum amount of coating is applied to the containers. According to an aspect, the controller is monitored via a computer that may interact with the dosing pump(s) and the applicator. The equipment may further include the use of air for distribution and drying of the composition. Examples of mixing and application equipment is presented in WO2005/049219 which is herein incorporated by reference for all purposes.

In an embodiment, the coating composition and the diluting liquid are stored separately and fed to a common feed line. The neat coating composition and the diluting liquid may be thoroughly mixed by a mixing before or within the common feed line. In an embodiment, the mixing is done with a mixing means having no moving parts such as a mixing chamber, e.g. a swirl chamber, mixing tank or the like, known from other applications like oil/gasoline mixing stations. A lengthwise extending mixing means with mixing vanes and/or mixing baffles within the liquid flow may be used such that the mixture of neat coating composition and diluting liquid is continuously transformed into an emulsion while flowing through the mixing means.

A static mixing means is useful in the present method and a diluted coating composition remains stable enough for the application.

The type of container upon which the composition of the invention and the method of the invention is employed is generally a reusable or recyclable container. Such containers are generally bottles and are comprised of either PET or glass. The usual type of returnable container to which the inventive method is applied is a glass bottle like a beer bottle.

The present invention is illustrated in more detail in the following nonlimiting examples.

EXAMPLES

A scratch-masking composition was prepared having the Formulations provided in Table 1:

TABLE 1

| Ingredient | Formulation (Weight Percent) | | | | | |
| --- | --- | --- | --- | --- | --- | --- |
| | 1 | 2C | 3 | 4 | 5 | 6C |
| Acetyltributyl Citrate | 64 | — | 80 | 93 | 95 | — |
| Laureth 3 | 0.1 | 1 | 1.5 | 2 | 4 | 4 |

TABLE 1-continued

| Ingredient | Formulation (Weight Percent) | | | | | |
|---|---|---|---|---|---|---|
| | 1 | 2C | 3 | 4 | 5 | 6C |
| Cis-9-Octadecenoic acid | 35 | 29 | 18.5 | 5 | 1 | 1 |
| Mineral oil | — | — | — | — | — | 95 |
| Triethyl Citrate | — | 70 | — | — | — | — |

Formula 2C is a comparative formula because it includes a water-soluble ester. Formula 6C is a comparative formula because it includes a mineral oil.

Example 1—Appearance after Application and Drying

A desirable feature for a scratch-masking composition is to improve optical appearance of the container for the customer. The optical appearance of the container was evaluated to determine the concentration range of the masking composition and the amount of the composition to apply to the container.

Test Method:

Scuffed glass 0.33 L bottles were weighed and then cooled to 4° C. The formulations provided in Table 1 were diluted with 5 weight percent water, 75 weight percent water, and 90 weight percent water. Each concentration was separately applied to the surfaces of the glass bottles using nonenergized spray nozzles to the cold bottles having condensation on their surfaces. The bottles were then allowed to dry naturally at room temperature. Once dry, the bottles were visually evaluated for appearance. Results are provided in Table 2.

TABLE 2

| Concentration | 1 | 2C | 3 | 4 | 5 | 6C |
|---|---|---|---|---|---|---|
| 10 wt % in water | pass | Fail | pass | pass | pass | Fail |
| 15 wt % in water | pass | Fail | pass | pass | pass | Fail |
| 95 wt % in water | pass | Fail | pass | pass | pass | Fail |

Pass = more than 90% of scuffing was covered.
Fail = surface remains scuffed, less than 90% of scuff marks were covered.

In general a range of from 10-80 mg of solution/bottle was applied to each bottle. The results showed that all the bottles were covered with the emulsion of the invention. Table 3 shows the results of applying Formula 3 to ten bottles at varying dilution.

TABLE 3

| | mg of solution after dry | | | | | | | | | |
|---|---|---|---|---|---|---|---|---|---|---|
| Concentration | Bottle Number | | | | | | | | | |
| in water wt % | 1 | 2 | 3 | 4 | 5 | 6 | 7 | 8 | 9 | 10 |
| 10 | 20 | 40 | 60 | 30 | 40 | 10 | 40 | 40 | 60 | 40 |
| 15 | 60 | 10 | 40 | 30 | 30 | 60 | 40 | 30 | 20 | 40 |
| 95 | 40 | 60 | 20 | 40 | 10 | 30 | 40 | 30 | 60 | 20 |

Example 2—Feel after Application and Drying

Once applied to a glass bottle, a thin film of the masking composition remains on the bottle. Ideally, no "finger prints" are visible on the bottle.

Test Method:

Glass 0.33 L bottles were cleaned, cooled and treated as provided in Example 1. Once dry, the bottles were touched with clean fingers. The intensity of fingerprints on the bottle was evaluated to see when they disappeared. It was undesirable if the finger prints lingered. The bottles were also tested for a greasy or sticky feel. Table 4 provides the results from the fingerprint touch test and Table 5 provides the results from the feel test:

TABLE 4

| | Fingerprints | | | | | |
|---|---|---|---|---|---|---|
| Concentration | Formulation | | | | | |
| wt % in water | 1 | 2C | 3 | 4 | 5 | 6C |
| 10 | pass | pass | pass | pass | pass | pass |
| 15 | pass | pass | pass | pass | pass | pass |
| 95 | Fail | Fail | Fail | pass | pass | Fail |

Pass = no fingerprints
Fail = presence of fingerprints

TABLE 5

| | Feel | | | | | |
|---|---|---|---|---|---|---|
| Concentration | Formulation | | | | | |
| wt % in water | 1 | 2C | 3 | 4 | 5 | 6C |
| 10 | pass | pass | pass | pass | pass | pass |
| 15 | pass | pass | pass | pass | pass | Fail |
| 95 | fail | fail | fail | fail | fail | fail |

Pass = surface is not sticky or slippery
Fail = surface feels greasy

Example 3—Persistence of Masking Formulation

Once applied to a glass bottle, the scratch masking composition has a certain shelf life. Ideally, the masking composition should remain on the container and not disappear during shelf life.

Test method: Glass 0.33 L bottles were cleaned, cooled and treated as provided in Example 1. Once dry, the bottles were immersed in a 30 degree C. water bath for 72 hours. The bottles were checked every 12 hours to see if the coating remained on the bottles. Results are provided in Table 6:

TABLE 6

| | Persistence of masking formulations at 72 hours | | | | | |
|---|---|---|---|---|---|---|
| Concentration | Formulation | | | | | |
| wt % in water | 1 | 2C | 3 | 4 | 5 | 6C |
| 10 | pass | Fail | pass | pass | Fail | Fail |
| 15 | pass | Fail | pass | pass | pass | Fail |
| 95 | pass | Fail | pass | pass | pass | Fail |

Pass = coating remained on the bottle for 72 Hours
Fail = coating was removed as evidenced by reappearance of scuff marks.

Example 4—Resistance to Ice Water

A masking composition should remain on a surface even if submerged in ice water.

Test method: Glass 0.33 L bottles were cleaned, cooled and treated as provided in Example 1. Once dry, the bottles were immersed in an ice bath for 72 hours. After 72 hours the bottles were removed and allowed to air dry at room temperature and then inspected visually for the appearance of scuff marks. Results are shown in Table 7 below:

TABLE 7

Persistence in ice-water at 72 hours

| Concentration wt % in water | Formulation | | | | | |
|---|---|---|---|---|---|---|
| | 1 | 2C | 3 | 4 | 5 | 6C |
| 10 | pass | Fail | pass | pass | pass | Fail |
| 15 | pass | Fail | pass | pass | pass | Fail |
| 95 | pass | Fail | pass | pass | pass | Fail |

Pass = coating remained on the bottle for 72 Hours
Fail = coating was removed and scuff marks reappeared.

Example 5—Persistence of Masking Formulation to Condensed Water

If a treated bottle is removed from refrigeration and stored at room temperature, condensation occurs on the bottle surface. After time, the condensed water dries. Such condensation and drying should not have a substantial influence on presence of the masking agent. This example was run to test the persistence of the formulation after condensation and drying had occurred.

Test method: Glass 0.33 L bottles were cleaned, cooled and treated as provided in Example 1. Once dry, the bottles were placed in a refrigerator at 5 degrees C. for 72 hours. The bottle was then removed from the refrigerator and stored at room temperature to generate condensed water on the bottle. The bottle was then stored at room temperature allowing the condensation to dry naturally. The bottles were visually evaluated to see if the coating remained and results are provided in Table 8 below. Note that it is easy to determine if the coating remains on the surface by whether or not the scuff marks returned.

TABLE 8

Persistence of masking formulation to condensed water at 72 hours Formulae

| Concentration wt % in water | Formulation | | | | | |
|---|---|---|---|---|---|---|
| | 1 | 2C | 3 | 4 | 5 | 6C |
| 10 | pass | Fail | pass | pass | pass | Fail |
| 15 | pass | Fail | pass | pass | pass | Fail |
| 95 | pass | Fail | pass | pass | pass | Fail |

Pass = the coating remained on the bottle after the condensation of water for 72 Hours.
Fail = the coating does not remain and the scuff marks reappeared.

The test results showed that the masking agent remained on the container surface for Formulations 1, 3, 4, and 5.

Example 6—Compatibility with Lubricants

Since the masking composition is applied during the production process when conveyor lubricants are used, a defined amount of masking composition is inevitably mixed with conveyor lubricant. To this end, the coating composition of the invention should not affect the lubricating of the conveyor or the containers. Likewise, a build-up of residue on the conveyor belt of the lubricant, the masking composition or a combination thereof should not occur.

Test method: Use (diluted) solutions of masking composition and conveyor lubricant were mixed in varying proportions. The use solutions were observed to see if the compositions separated or if precipitation occurred. After applying the compositions to glass bottles as prepared according to Example 1, the coefficient of friction was measured. Results are provided in Table 9 below.

TABLE 9

Compatibility with lubricants
The lubrication test was made with Lubri-klenz ™ S commercially available from Ecolab Inc. located in St. Paul, MN at 0.3% in solution, the average coefficient of friction for this lubricant was 0.12 to 0.15

| | Concentration in water wt % | | | |
|---|---|---|---|---|
| | 10 wt % | 15 wt % | 95 wt % | |
| Formula | Average coefficient of friction during the application of the composition | | | Observation |
| 1 | 0.12-0.14 | 0.11-0.14 | 0.11-0.13 | No residue was formed |
| 2C | 0.11-0.14 | 0.11-0.14 | 0.11-0.13 | No residue was formed |
| 3 | 0.12-0.14 | 0.11-0.14 | 0.11-0.13 | No residue was formed |
| 4 | 0.12-0.15 | 0.11-0.14 | 0.11-0.13 | No residue was formed |
| 5 | 0.12-0.15 | 0.11-0.14 | 0.11-0.13 | No residue was formed |
| 6C | 0.12-0.14 | 0.11-0.14 | 0.11-0.13 | Black spots formed |

The results demonstrate that Formulae 1-5 were compatible with the lubricant. When Formula 6 was used in the presence of the lubricant the coefficient of friction remained low but black spots formed.

The present invention should not be considered limited to the particular examples described above, but rather should be understood to cover all aspects of the disclosure as fairly set out in the attached claims. Various modifications and equivalent processes to the disclosed invention may be applicable will be readily apparent to those of skill in the art upon review of the instant specification.

I claim:

1. A method of applying a composition to containers for masking scratches, comprising:
   diluting a composition with about 5 wt % to about 95 wt % water, the composition comprising a water insoluble ester of citric or acetic acid, a surfactant, and a monounsaturated fatty acid;
   applying the diluted composition to the side of scratched containers;
   filling the container with a beverage; and
   sealing the container.

2. The method of claim 1, wherein the surfactant is an ethoxylated alcohol.

3. The method of claim 1, wherein the monounsaturated fatty acid is cis-9-octadecenoic acid.

4. The method of claim 1, wherein the composition comprises
   about 50 wt. % to about 99.9 wt. % of a water insoluble ester of citric or acetic acid;
   about 0.1 wt. % to about 5 wt. % surfactant; and
   about 0.1 wt. % to about 20 wt. % monounsaturated fatty acid.

5. The method of claim 1, wherein the composition is applied by spraying, dipping, brushing, rolling, flow-coating, sponging, nebulization or curtain-coating.

6. The method of claim 1, wherein the container is glass or plastic.

7. The method of claim 6, wherein the container is glass.

8. The method of claim 1, wherein the temperature of the container surface is colder than room temperature.

9. The method of claim 1, wherein the composition is free of paraffinic oil.

10. A method of applying a composition to containers for masking scratches, comprising:
 filling a scratched container with a cold beverage;
 sealing the container; and
 applying a masking composition to the side of the container, the masking composition comprising a water insoluble ester of citric or acetic acid, a surfactant, and a monounsaturated fatty acid.

11. The method of claim 10, wherein the surfactant is an ethoxylated alcohol.

12. The method of claim 10, wherein the monounsaturated fatty acid is cis-9-octadecenoic acid.

13. The method of claim 10, wherein the composition comprises:
 about 50 wt. % to about 99.9 wt. % of a water insoluble ester of citric or acetic acid;
 about 0.1 wt. % to about 5 wt. % surfactant; and
 about 0.1 wt. % to about 20 wt. % monounsaturated fatty acid.

14. The method of claim 10, wherein the composition is applied by spraying, dipping, brushing, rolling, flow-coating, sponging, nebulization or curtain-coating.

15. The method of claim 10 wherein the container is glass or plastic.

16. The method of claim 10 wherein the container is glass.

17. The method of claim 10, wherein the composition is free of paraffinic oil.

18. The method of claim 1, wherein the diluted composition is applied to scratched containers before filling the container with a beverage and sealing the container.

19. The method of claim 1, wherein the diluted composition is applied to scratched containers after filling the container with a beverage and sealing the container.

* * * * *

UNITED STATES PATENT AND TRADEMARK OFFICE
CERTIFICATE OF CORRECTION

PATENT NO. : 10,717,106 B2
APPLICATION NO. : 15/374134
DATED : July 21, 2020
INVENTOR(S) : Fabiola Morales Arriaga Page 1 of 1

It is certified that error appears in the above-identified patent and that said Letters Patent is hereby corrected as shown below:

In the Claims

Column 26, Line 52, Claim 4: "comprises" should read --comprises:--

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*